Figure 1:
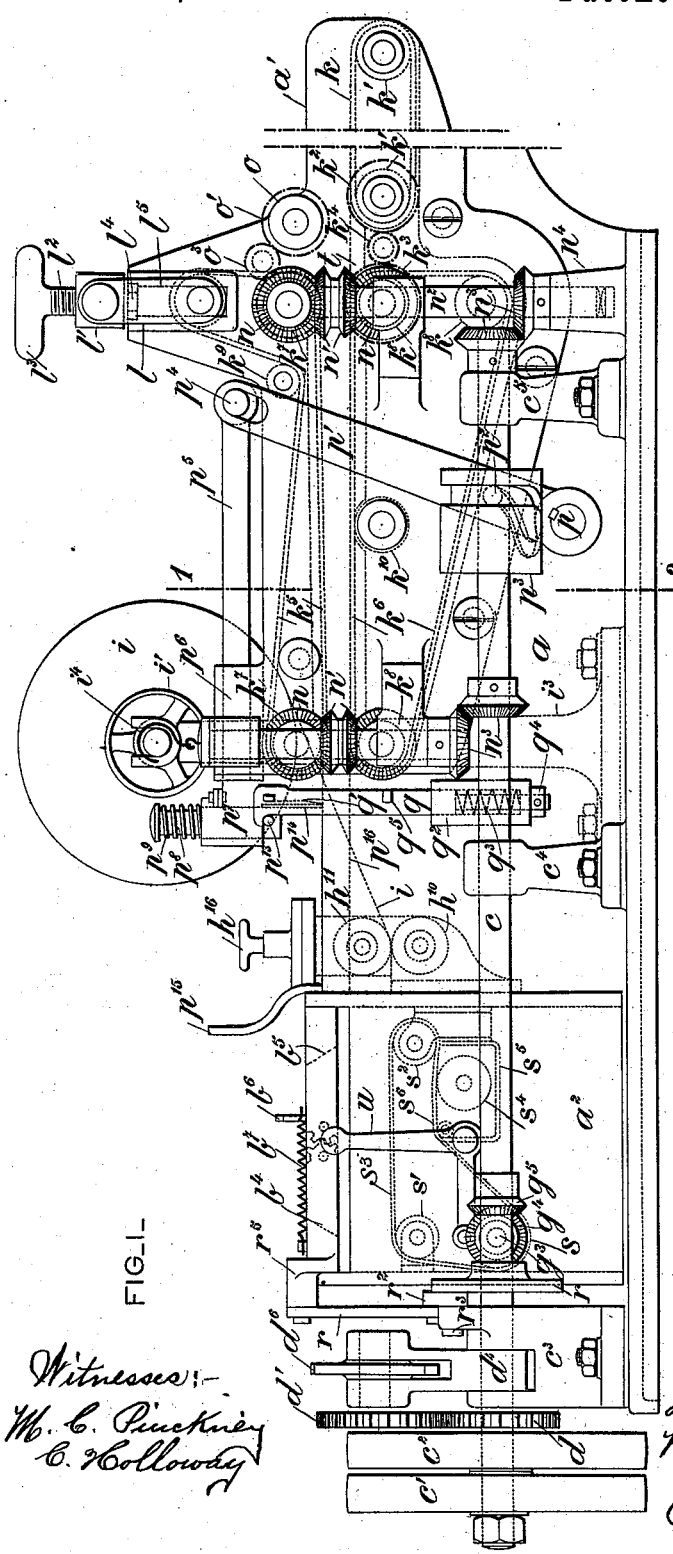

(No Model.) 7 Sheets—Sheet 1.
H. F. M. LEMAIRE.
MACHINE FOR MAKING PASTED CIGARETTES.

No. 568,538. Patented Sept. 29, 1896.

Witnesses:—
M. C. Pinckney
E. Holloway

Inventor:—
Henri F. M. Lemaire,
By J.E.M. Dover
Atty.

THE NORRIS PETERS CO., PHOTO-LITHO., WASHINGTON, D. C.

(No Model.) 7 Sheets—Sheet 2.
H. F. M. LEMAIRE.
MACHINE FOR MAKING PASTED CIGARETTES.
No. 568,538. Patented Sept. 29, 1896.
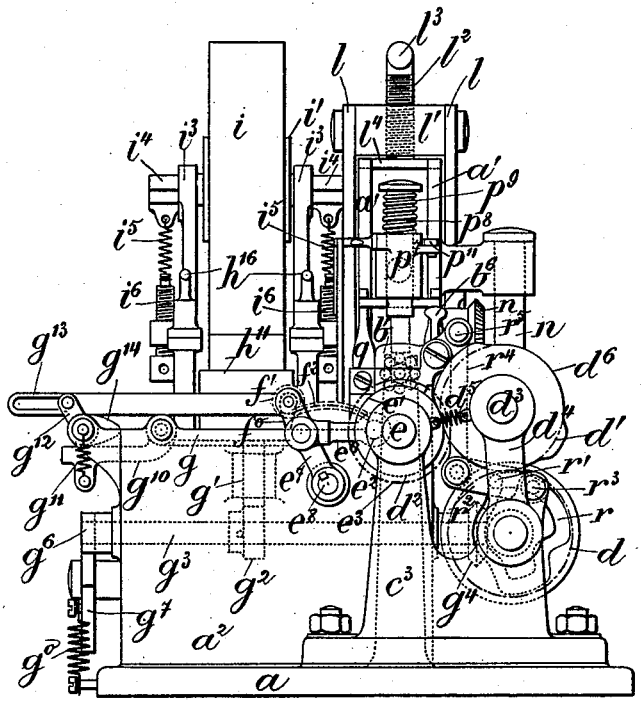
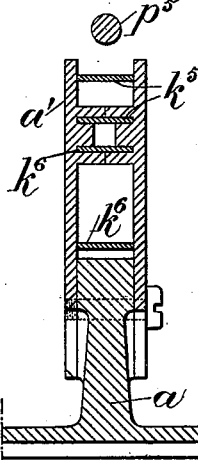
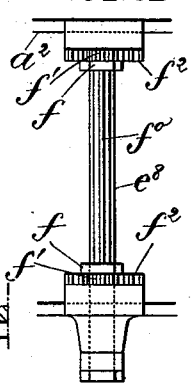
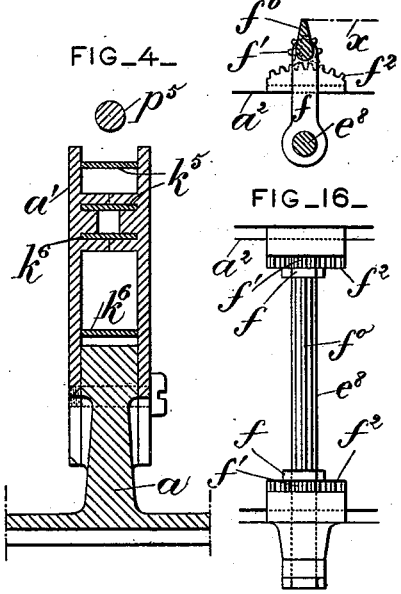
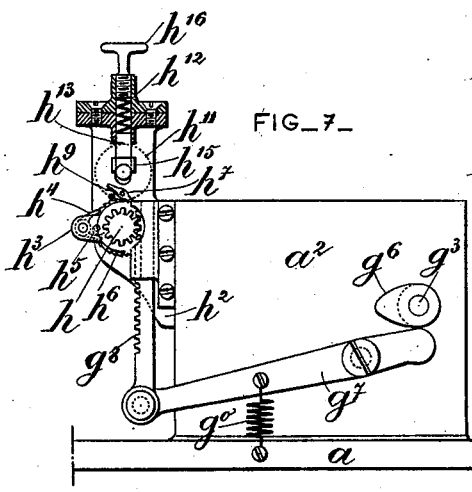
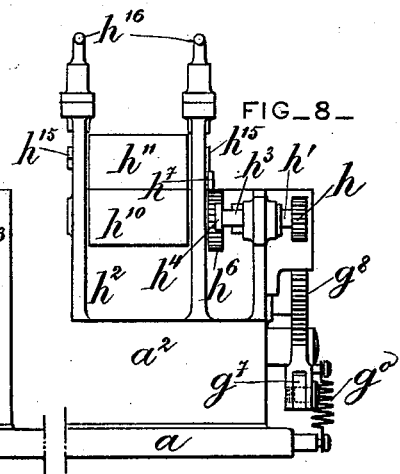
Witnesses:
W. E. Bowen
M. C. Pinckney
Inventor:
Henri F. M. Lemaire,
By J. E. M. Bowen
Attorney (No Model.)
7 Sheets—Sheet 3.
H. F. M. LEMAIRE.
MACHINE FOR MAKING PASTED CIGARETTES.
No. 568,538.
Patented Sept. 29, 1896.
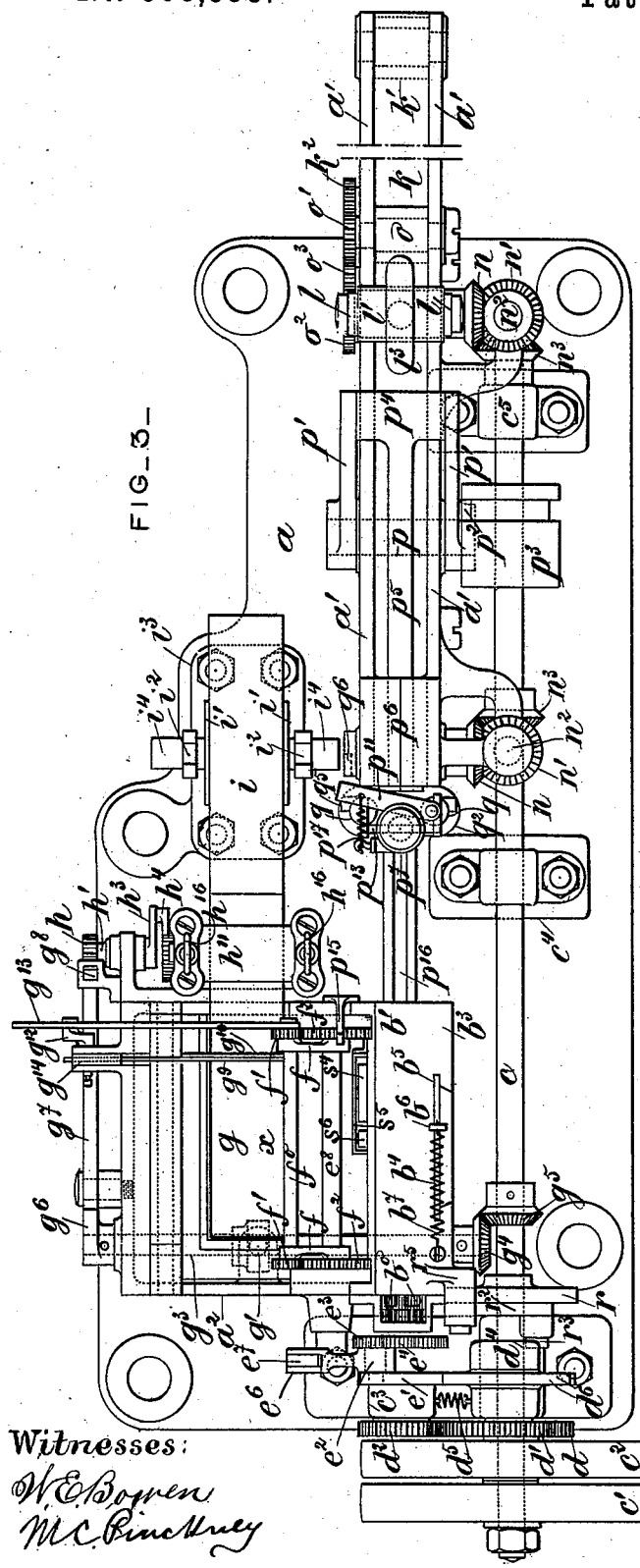
Witnesses:
W. E. Bowen
M. C. Pinckney
Inventor:
Henri F. M. Lemaire,
By J. E. M. Bowen,
Attorney.

(No Model.) 7 Sheets—Sheet 4.
H. F. M. LEMAIRE.
MACHINE FOR MAKING PASTED CIGARETTES.
No. 568,538. Patented Sept. 29, 1896.
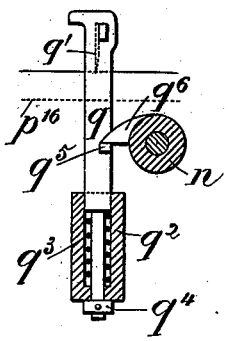
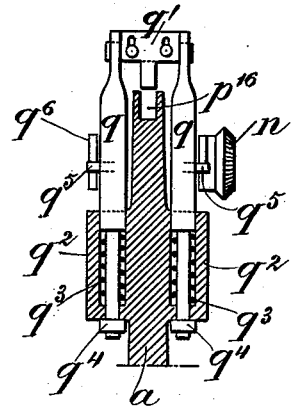
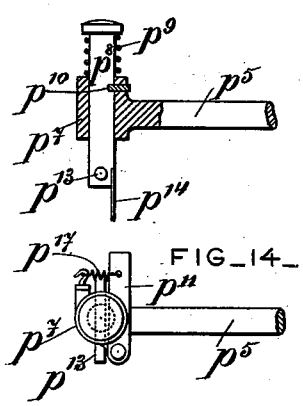
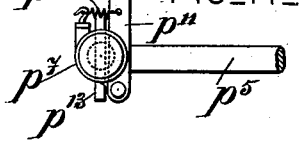
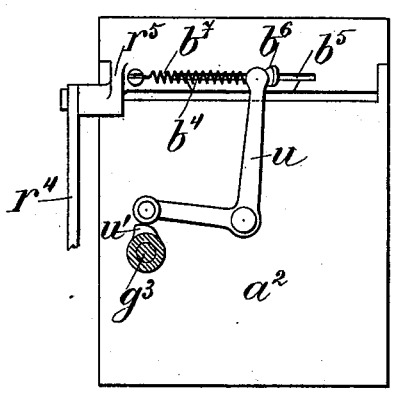
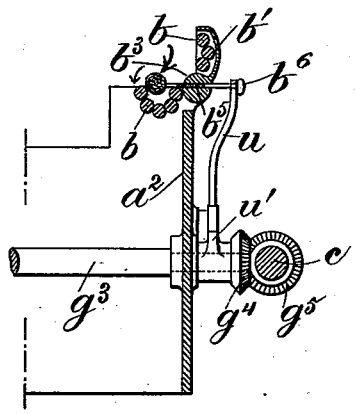
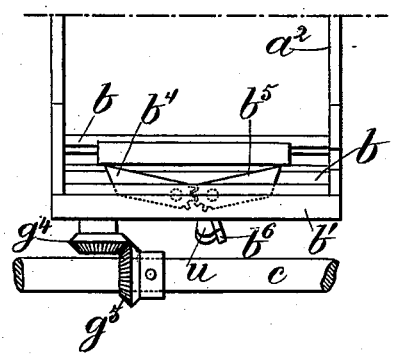
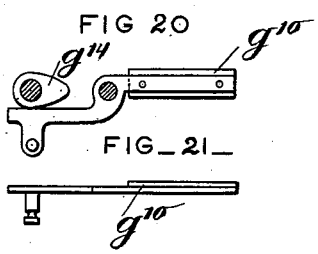
Witnesses
Inventor:—
Henri F. M. Lemaire, (No Model.) 7 Sheets—Sheet 5.
H. F. M. LEMAIRE.
MACHINE FOR MAKING PASTED CIGARETTES.
No. 568,538. Patented Sept. 29, 1896.
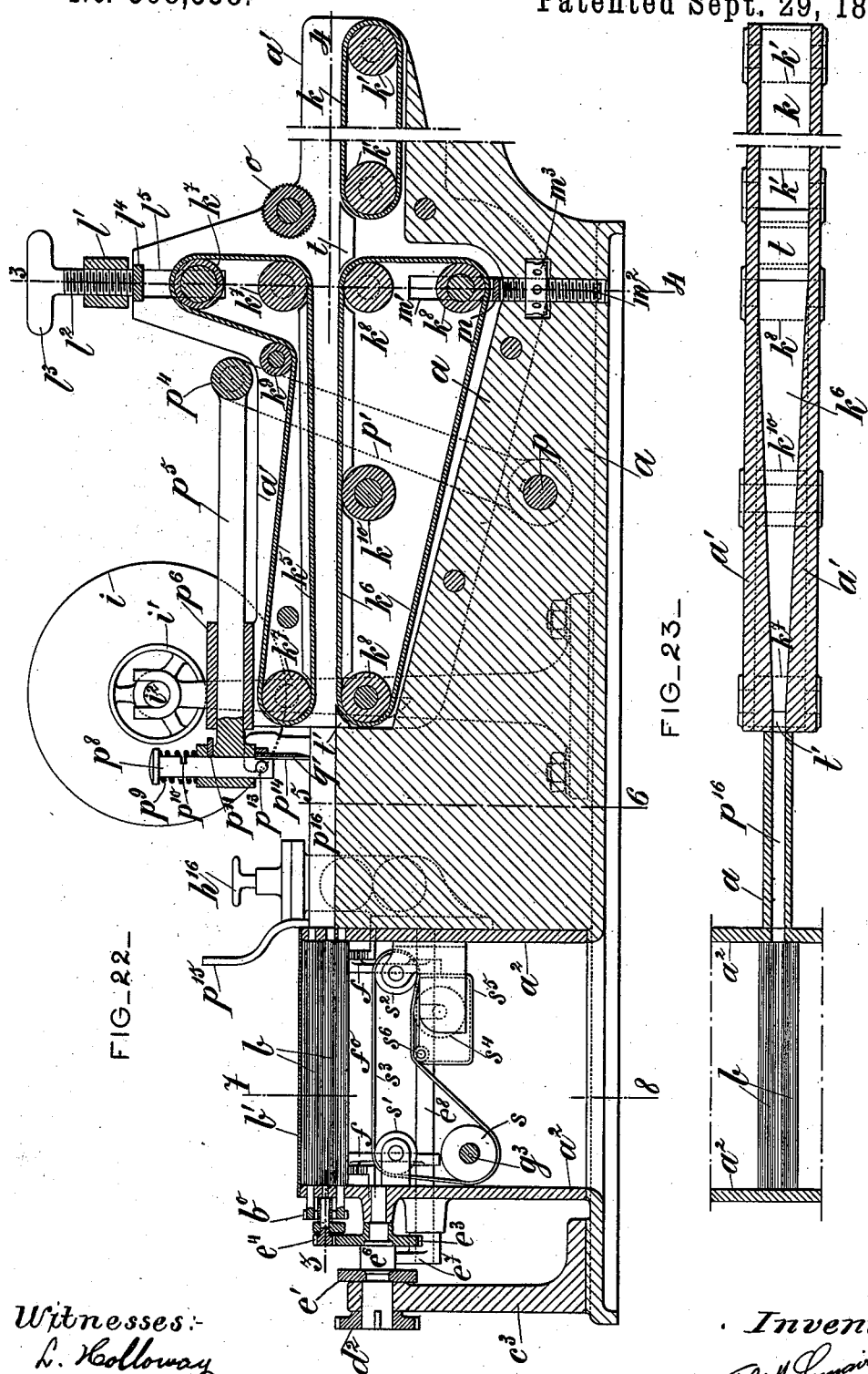
Witnesses:-
L. Holloway
W. E. Bowen
Inventor
Henri Felix M. Lemaire
By J. E. W. Bowen
Atty (No Model.) 7 Sheets—Sheet 6.
H. F. M. LEMAIRE.
MACHINE FOR MAKING PASTED CIGARETTES.
No. 568,538. Patented Sept. 29, 1896.
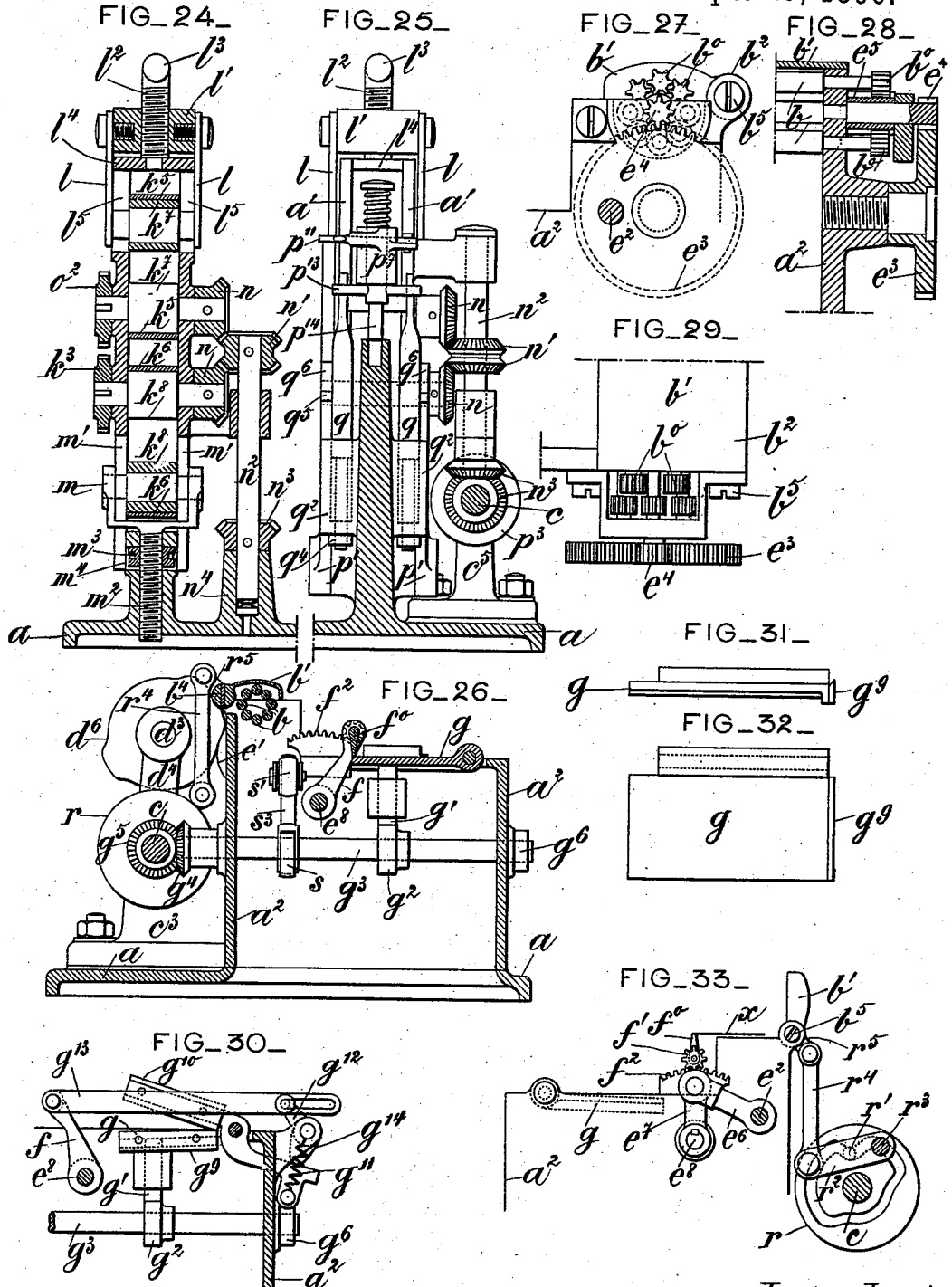
Witnesses:—
L. Holloway
W. C. Bowen
Inventor:
Felix M. Lemaire
by J. E. Maldren
Atty (No Model.)    H. F. M. LEMAIRE.    7 Sheets—Sheet 7.
MACHINE FOR MAKING PASTED CIGARETTES.

No. 568,538.    Patented Sept. 29, 1896.

Witnesses:
L. Holloway
N. O. Bowen

Inventor:
Henri Felix M. Lemaire
By J. E. M. Bowen
Atty

UNITED STATES PATENT OFFICE.

HENRI FELIX MARIE LEMAIRE, OF PARIS, FRANCE.

MACHINE FOR MAKING PASTED CIGARETTES.

SPECIFICATION forming part of Letters Patent No. 568,538, dated September 29, 1896.

Application filed January 19, 1895. Serial No. 535,500. (No model.) Patented in France June 14, 1894, No. 239,292; in Belgium December 13, 1894, No. 113,178; in Spain December 14, 1894, No. 16,729; in Switzerland December 18, 1894, No. 9,463; in Luxemburg December 20, 1894, No. 2,200; in England December 28, 1894, No. 25,219; in Germany January 9, 1895, No. 83,696 and No. 86,847; in Norway February 8, 1895, No. 4,164; in Denmark February 8, 1895, No. 501; in Italy February 13, 1895, XXIX, 38,185; in Hungary December 7, 1895, No. 4,791, and in Austria April 15, 1896, No. 46/1,499.

*To all whom it may concern:*

Be it known that I, HENRI FELIX MARIE LEMAIRE, manfacturer, a citizen of the Republic of France, residing at 152 Rue de Rivoli, Paris, France, have invented certain Improvements in Machines for Making Pasted Cigarettes, (for which I have obtained Letters Patent in the following countries: France, No. 239,292, dated June 14, 1894; Belgium, No. 113,178, dated December 13, 1894; Spain, No. 16,729, dated December 14, 1894; Switzerland, No. 9,463, dated December 18, 1894; Great Britain, No. 25,219, dated December 28, 1894; Luxemburg, No. 2,200, dated December 20, 1894; Germany, Nos. 83,696 and 86,847, dated January 9, 1895; Austria, No. 46/1,499, dated April 15, 1896; Hungary, No. 4,791, dated December 7, 1895; Norway, No. 4,164, dated February 8, 1895; Denmark, No. 501, dated February 8, 1895, and Italy, No. XXIX, 38,185, dated February 13, 1895,) of which the following is a specification.

My invention relates to improvements in machines for making pasted cigarettes provided with all the necessary devices in order that the attendant may only have to give out the tobacco on a movable belt which operates the feed of the machine. All other operations are mechanically done, and they are as follows: feeding and compressing the tobacco, distributing the same into the roller-frame, rolling the same, feeding, rolling, and pasting of the paper, and, finally, throwing out the cigarettes.

The portion of the machine wherein the cigarette is rolled comprises a frame constructed in two sections and containing eight parallel rollers. The tobacco is fed in the direction of the axis of said frame in a continuous layer of predetermined dimensions and cut to make the cigarette on a width of about six millimeters, so as to leave but few loose ends, and thus prevent waste and also the annoyance which would result from the adherence of these loose ends, especially at the ends of the cigarette. The roller-frame offers also the advantage of preventing the tobacco from getting rammed in a paper tube and of allowing its uniform compression. So this machine is especially intended for the making of cigarettes of good quality, easy to smoke, not too easily put out, and from the well-cut ends of which no tobacco can escape the paper tube.

Figure 6:
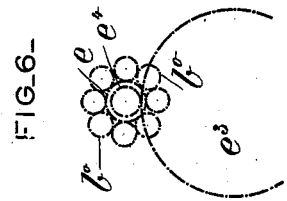
Figure 5:
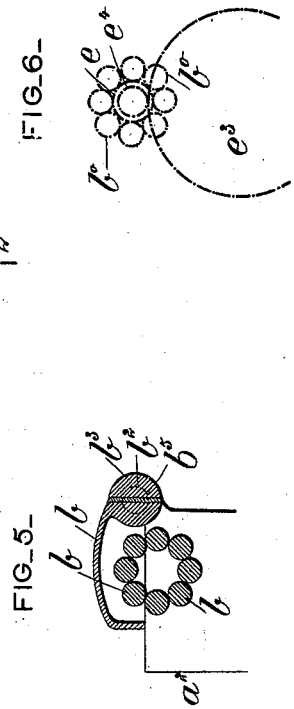
Figure 34:
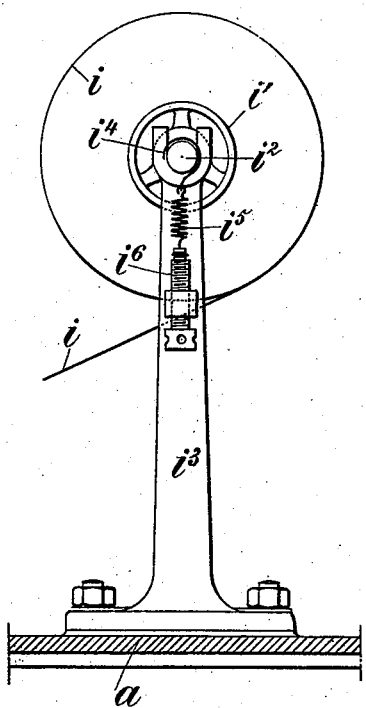
Figure 35:
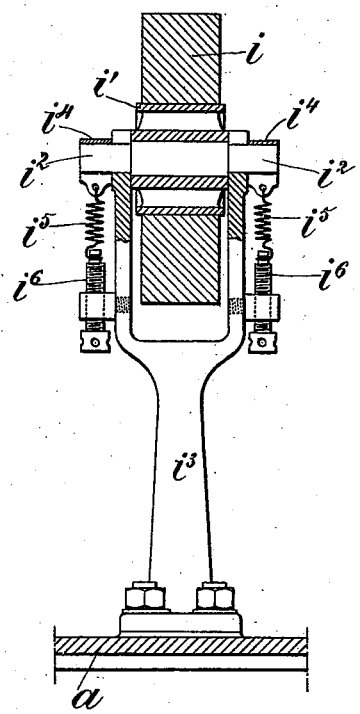
Figure 36:
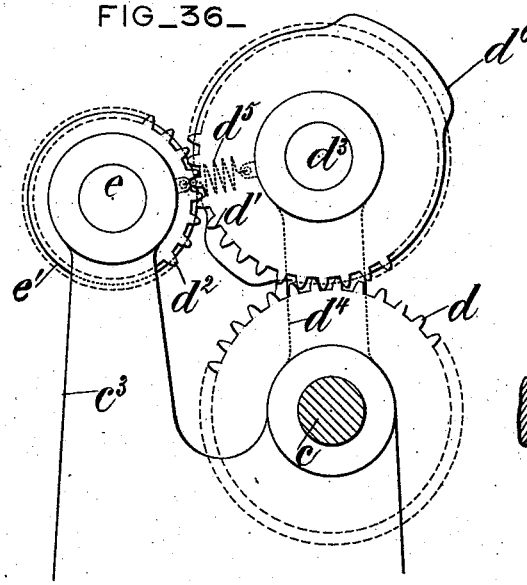
Figure 37:
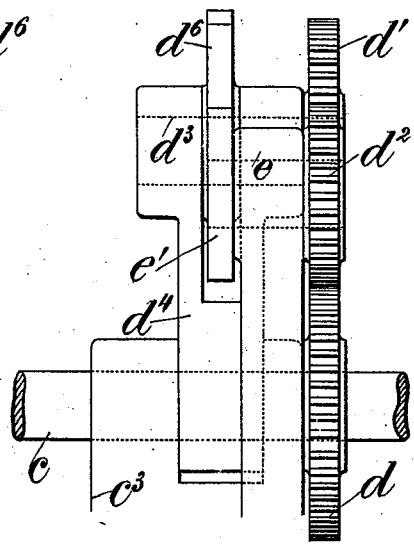

In the accompanying drawings, Figure 1 represents an elevation of the machine. Fig. 2 is a side view of the same, taken from the left-hand side of Fig. 3, the pulleys being removed. Fig. 3 is a plan view. Fig. 4 is a cross-section of the frame on the line 1 2 of Fig. 1. Fig. 5 represents a transverse section of the roller-frame. Fig. 6 shows the system of gears for operating the rollers. Figs. 7 and 8 are respectively an elevation and side view of the paper-feeding device. Figs. 9 and 10 are respectively an elevation and a section of the device for extending the lower belt for feeding the tobacco. Figs. 11 and 12 represent, respectively, a sectional elevation and a cross-section of the tobacco-cutting device. Figs. 13 and 14 are respectively a sectional elevation and a plan view of the device for bringing the tobacco-feed rod into movement. Figs. 15 and 16 represent a cross-section and a plan of the device for operating the pasting-blade. Figs. 17, 18, and 19 are respectively an elevation, a cross-section, and a plan view of the device for throwing out the cigarettes. Figs. 20 and 21 represent in elevation and in plan the device for controlling the movable blade of the paper-scissors. Fig. 22 is a longitudinal section of the machine. Fig. 23 is a horizontal section on line 3 4 of Fig. 22. Figs. 24, 25, and 26 are respectively cross-sections on the lines 3 4, 5 6, and 7 8 of Fig. 22. Figs. 27, 28, and 29 are respectively an elevation, a longitudinal section, and a top plan view of the device and gearing for operating the rollers for rolling the cigarette. Fig. 30 is a view of the mechanism of the paper-scissors. Figs. 31 and 32 show, respectively, an elevation and a plan of the movable table for the paper. Fig. 33 is a partial view showing the mechanism which operates the cap of the lid of the roller-frame and also that of the pasting-blade. Figs. 34 and 35 are respectively an elevation and the side view, partly in section, of a device which supports the roll of paper. Figs. 36 and 37 represent, on an enlarged scale, the principal gearing and cam mechanism.

The machine comprises a frame $a$, on which are fixed two parallel cheeks $a'$ $a'$, a casing $a^2$, and different bearings. The mold located at the top of the casing $a^2$ comprises eight rollers $b$, Fig. 5, arranged in two series, the lower one, consisting of five rollers, supported by two of the parallel sides of the casing $a^2$, the upper series, consisting of three rollers, supported by the cheeks of a cap or lid $b'$, capable of vibrations around a fixed axis $b^2$. The cap $b'$ carries a cylindrical lug $b^3$, on which are pivoted two levers $b^4$ $b^5$, gearing by their geared ends, the lever $b^5$ being provided with a wing $b^6$, subject to the action of an opposing spring $b^7$.

On the three bearings $c^3$ $c^4$ $c^5$, fixed on the frame $a$, rests a main shaft $c$, one end of which receives a pair of pulleys $c'$ $c^2$, one loose, the other fixed. On the said shaft $c$ is also carried a gear-wheel $d$, gearing with another wheel $d'$, which can be put into gear with a third wheel $d^2$, carried by an idle shaft $e$. The gear-wheel $d'$ is carried by a shaft $d^3$, capable of rotation in a bearing $d^4$, loosely mounted on the shaft $c$ and connected by a spiral spring $d^5$ to the bearing $c^3$ of the shaft $e$. On the shaft $d^3$ is also fixed a cam $d^6$, at all times held in contact with a disk $e'$, mounted on the end of the shaft $e$ by the spring $d^5$, Figs. 36 and 37. The disk $e'$ is connected by a spindle $e^2$ with a toothed plate $e^3$, which gears with a pinion $e^4$, on the shaft of which is mounted another pinion $e^5$, Figs. 27, 28, and 29. Each of the eight rollers $b$ bears at the outside a pinion $b^0$. The five pinions of the lower series of fixed rollers are at all times in gear with the pinion $e^5$, while the three pinions $b^0$ of the rollers $b$, fixed on the cap or lid $b'$, only gear with the pinions $e^5$ when the said cap $b'$ is down. The pinions $b^0$, which are not intended to gear together, are arranged in two circular rows separated from each other in such a way that the pinions are placed two by two in the same row.

On the spindle $e^2$ is pivoted a pitman $e^6$, connected with a crank-arm $e^7$ on the end of a shaft $e^8$, passing through the casing $a^2$, on which are fixed two parallel crank-arms $f\,f$. In the eyelets of these crank-arms turns a spindle $f^0$, which is cuneiform in cross-section, and on the cylindrical ends of which are carried two pinions $f'$, which gear with toothed segments $f^2$, fixed on the casing $a^2$, Figs. 15, 16, and 26. On the said casing $a^2$ is pivoted a table $g$, which bears on a guided rod $g'$, which bears on a cam $g^2$, fixed on a shaft $g^3$, which carries at one end a conical pinion $g^4$, gearing with a pinion $g^5$ on the shaft $c$. On the other end of the shaft $g^3$ is mounted a cam $g^6$, Figs. 7 and 8, which controls a lever $g^7$, pivoted to a toothed rack $g^8$ and held in contact with the cam $g^6$ by an opposing spring $g^9$. The said toothed rack $g^8$ gears with a toothed pinion $h$, integral with a shaft $h'$, mounted in a bearing $h^2$ and carrying a crank-arm $h^3$. The latter is provided with a pawl $h^4$, held in contact by a spring $h^5$ with a ratchet-wheel $h^6$, also engaged by another pawl $h^7$, on the tail end of which passes a spring $h^9$. The shaft of the ratchet-wheel $h^6$ carries a cylinder $h^{10}$, against which is pressed a similar cylinder $h^{11}$ by springs $h^{12}$, which push pistons $h^{13}$, carried in bearings $h^{15}$, in the shaft of the cylinder $h^{11}$. The pressure exercised by the springs $h^{12}$ can be regulated by means of a screw $h^{16}$.

On the shaft $g^3$ is fixed a pulley $s$, around which runs a rubber belt which passes also around the pulleys $s'$ $s^2$, and over two rollers $s^4$ $s^6$, the larger one $s^4$ of which partially bathes in the liquid paste contained in a vessel $s^5$, fixed to the casing $a^2$. The paper $i$ for making the paper tubes is wound on a drum $i'$, carried by a shaft journaled in bearings in support $i^3$, bolted onto the frame $a$. The end of each of the gudgeons $i^2$ is partially embraced by a collar $i^4$, attached to a spring $i^5$, the tension of which may be regulated by a set-screw $i^6$, so as to regulate the pressure of the collar $i^4$ on the gudgeon $i^2$, the said collar $i^4$ thus performing the part of a friction-brake and allowing of opposing a predetermined resistance to the rotation of the gudgeons $i^2$ in the supports $i^3$.

Between the cheeks $a'$ a feed-belt $k$ is arranged on rollers $k'\,k'$. One of the rollers $k'$ is mounted on the shaft of a toothed wheel $k^2$, which controls a wheel $k^3$ by means of a pinion $k^4$. Two other endless belts $k^5$ $k^6$ are also arranged one above the other within the cheeks $a'$ $a'$, and pass over rollers $k^7$ $k^8$, respectively, the upper endless belt $k^5$ passing over a distance-roller $k^9$ and the lower belt $k^6$ being supported near its middle by a loose roller $k^{10}$.

The upper and lower rollers $k^7$ and $k^8$ are able to move in order to give the required tension to the belts $k^5$ and $k^6$. For that purpose the ends of the shaft of the upper roller $k^7$ are pivoted to small pitmen $l\,l$, which are in turn pivoted to a nut $l'$. Through the said nut $l'$ extends a screw $l^2$, provided with an operating-handle $l^3$ and bearing on a supporting-plate $l^4$, fixed on the cheeks $a'$, serving as guides to the spindle of the roller $k^7$, which extends along the said grooves.

It will be understood that when the handle $l^3$ is turned in the desired direction the said roller $k^7$ may be raised or lowered, and thus stretch or unstretch the belt $k^5$. The ends of the shaft or spindle of the lower roller $k^8$ are engaged by a forked piece $m$ and are movable, as well as the said piece $m$, in grooves $m'$ in the cheeks $a'$. The piece $m$ bears a screw-threaded rod $m^2$, placed in a nut $m^3$, which is housed in a recess $m^4$ in the frame $a$, in which there is also a cylindrical hole in which is housed the rod $m^2$. The nut $m^3$ is provided with holes in its outside to allow of operating it. When the said nut $m^3$ is turned, the screw $m^2$, which is prevented from turning by the forked piece $m$, is either raised or lowered according to the direction in which the nut $m^3$ is turned, and carries along with it the roller $k^8$, which either stretches or unstretches the belt $k^6$.

One of the ends of the shafts or spindles of four of the rollers $k^7$ and $k^8$ carries a toothed pinion $n$, which gears with a pinion $n'$. The four pinions $n'$ gear together two by two, and are mounted, respectively, on vertical shafts $n^2$, which bear the pinions $n^3$, gearing with other similar pinions mounted on the shaft $c$. The lower end of one of the shafts $n^2$ is supported in a bracket $n^4$, integral with the frame $a$.

A roller $o$, provided with ridges or points, is mounted on a shaft or spindle journaled in bearings in the cheeks $a'$ and carrying a toothed wheel $o'$, which gears with a pinion $o^3$, the spindle or pin of which is fixed to one of the cheeks $a'$. The said pinion $o^3$ gears with a wheel $o^2$ on the shaft of one of the rollers $k^7$.

At the ends of a shaft $p$, extending across the frame $a$, are mounted two levers $p'$, one of which carries a button $p^2$, which is engaged in the groove of a cylindrical cam $p^3$, fixed on the shaft $c$.

The ends of the levers $p'$ are provided with oblong holes in which are housed the ends of a cross-bar $p^4$, integral with a rod $p^5$, moving in a slide $p^6$ in two parts, which are integral with the cheeks $a'$.

The lower portion of the frame $a$ has passing through it a spindle $p$, on the ends of which are mounted two levers $p'$, which are alike, one of them being provided with a button $p^2$, taking into the groove of a cylindrical cam $p^3$, located on the shaft $c$. The ends of the levers $p'$ are pierced by oblong slots, into which take the branches of a cross-bar $p^4$, integral with a rod $p^5$, sliding in ways or guides $p^6$, cast with the cheeks $a'$. The rod $p^5$ has on its end a socket $p^7$, in which may slide a rod $p^8$, subject to the action of an opposing spring $p^9$. The rod $p^8$ is pierced by a slot $p^{10}$, in which may engage a small lever $p^{11}$, attached to spiral spring $p^{17}$, partially housed in a slot in the socket $p^7$ and capable of coming into contact with an abutment or stop $p^{15}$, fixed on the casing $a^2$. The rod $p^8$ is provided at its lower portion with two symmetrical spurs $p^{13}$ and with a steel blade $p^{14}$, having movement in a channel $p^{16}$, cut in the frame $a$. The spurs $p^{13}$ can come into contact with the rods $q$, carrying a knife $q'$, and capable of easy frictional movement in cylindrical bosses $q^2$ on the frame $a$. These bosses contain spiral springs $q^3$, which tend to raise the rods $q$, the stroke of which is limited by the nuts $q^4$, screwed onto their lower portion. The rods $q$ carry studs $q^5$, on which can simultaneously act cams $q^6$, carried by the spindle of one of the rollers $k^8$. On the spindle $c$ is also mounted a cam $r$, in the groove of which takes the button $r'$ of a lever $r^2$, able to vibrate on a spindle $r^3$ and pivoted also to a small connecting-rod $r^4$. The connecting-rod $r^4$ connects with a lever $r^5$, integral with the cap $b'$.

Between the cheeks $a'$ are arranged two bridges $t\ t'$ in the upper plane of the belts $k\ k^6$, so that the said plane is without a break as far as the channel $p^{16}$. Lastly, on one side of the casing $a^2$ is arranged an elbow crank-lever $u$, one of the ends of which is in contact with a cam $u'$, integral with the pinion $g^4$.

Operation: The driving-belt being on the fixed pulley $c^2$ the shaft $c$ is rotated and moves, as required, all the working parts hereinbefore described. The said shaft $c$ turns the beveled gear $n^3$, the shafts $n^2$, the pinions $n'$, which in turn rotate the pinions $n$, and consequently the rollers $k^7\ k^8$, and the toothed wheels $k^3$ and $o^2$. The latter turn, respectively, the wheels $k^2$ and $o'$, as well as the roller $k'\ o$, through the pinions $k^4$ and $o^3$. The belts $k\ k^5\ k^6$ also receive motion, and the tobacco which it is desired to transform into cigarettes is apportioned by hand on the feed-belt $k$. This tobacco is fed to the roller $o$, which forces it into the channel reserved for it between the cheeks $a'$ and the belts $k^5\ k^6$, which feed it to the channel $p^{16}$, which thus becomes filled with the necessary supply for one cigarette. At this moment the cams $q^6$ act on the buttons $q^5$, and the rods $q$ are lowered in carrying with them the rod $p^8$ and the knife $q'$, which cuts the tobacco. When this operation is over, the cams release the studs $q^5$, the rods $q$ are moved up by the springs $q^3$, and then the cams $r$ and $p^3$ act simultaneously, the former $r$ to vibrate the lever $r^2$, which transmits its movement to the lever $r^5$ by means of the connecting-rod $r^4$, and the cap $b'$ moves up, the latter cam $p^3$ to vibrate the levers $p'$, which give to the rod $p^5$ a transferring movement, during which the blade $p^{14}$, which moved down with the knife $q'$, and is held in its lowermost position by the engagement in the slot $p^{10}$ of the lever $p^{11}$, drawn back by the spring $p^{17}$, moves in the channel $p^{16}$, and pushes into the roller-frame the tobacco in front of it. At the end of its stroke the lever $p^{11}$ meets the stud $p^{15}$, which gives it sufficient vibration to cause it to leave the slot $p^{10}$ in the rod $p^8$, which flies up under the action of the spring $p^9$, so that when the rod $p^5$ comes back on itself under the action of the cam $p^3$ the blade $p^{14}$ cannot push the new supply of tobacco which moves forward in the channel $p^{16}$. At the end of this return stroke the spurs $p^{13}$ again come into contact with the rods $q$. During the introductions of the tobacco into the roller-frame the cam $d^6$ is in contact by one of its projections with the disk $c'$, and for that reason its center is sufficiently far from it for the two wheels $d'$ and $d^2$ to remain no longer in gear. The wheel $d'$ can no longer transmit its movement to the wheel $d^2$, the result being that all the members controlled by this wheel, and among them the mold-rollers $b$, are stopped. When the tobacco is introduced between the said rollers $b$, the cam $r$ closes the cap or lid $b'$, so that all the pinions $b^0$ gear with the pinion $e^5$ and the tobacco is vertically compressed. At this moment the projection of the cam $d^6$ leaves the disk $e'$, the centers of these members get nearer under the action of the spring $d^5$, which causes the support $d^4$ to vibrate on the shaft $c$; the wheels $d'$ and $d^2$ are again in gear, the latter moving, through the journal $e^2$, the toothed plate $e^3$ and consequently the pinions $e^4$ and $e^5$, as well as the eight pinions $b^0$. The rollers $b$ turn in forming into a cylinder the tobacco shut in between them. The pinion $g^5$ continuously rotates the pinion $g^4$ and the shaft $g^3$, and at a given moment the cam $g^2$ lifts the rod $g'$ and the table $g$, which comes and supports a leaf of paper, which it carries, against the blade $f^0$, besmeared with paste, as hereinafter described. The said blade $f^0$ is then carried on, together with the leaf adhering to it, by the crank-arms $f$, which receive their movement from the connecting-rod $e^6$ and the lever $e^7$, mounted on the same shaft as the said crank-arms, while the pinions $f'$, which roll on the segments $f^2$, rotate the blade $f^0$ in such a manner that at the middle of its stroke it becomes vertical and presents horizontally the leaf of paper $x$ in the inside of the roller-frame, which has just opened under the action of the cam $r$, as hereinbefore described. At this moment the second projection or cam-surface of the cam $d^6$ has separated the gears $d'$ and $d^2$ and the rollers $b$ have stopped. Then the cap or lid $b'$ closes again, the rollers $b$ take the paper $x$ and roll and paste it around the tobacco, and the cigarette is finished. The lid $b'$ again rises, while the rollers $b$ continue to turn, the cam $u'$ causes the lever $u$ to vibrate, the free end of the said lever $u$ strikes the lug $b^6$, which vibrates, as well as the blade $b^5$ and the blade $b^4$ in gear with it. The two blades or plates $b^4$ and $b^5$ move in an angle above the lower series or set of rollers $b$, and throw out from the machine the finished cigarette. The cigarette is lifted from its position in contact with the lower set of rolls into that illustrated in Fig. 18, so as to be ejected from the chamber carrying the rolls. This is accomplished in the following manner: As blades $b^4$ and $b^5$ vibrate toward the cigarette their outer ends push the cigarette toward the roller to the extreme left, which is mounted on the lower stationary part of the frame. The direction of the revolving movement of said roller, as well as that of the cigarette, is indicated in Fig. 18 by arrows, and it will be seen that after opening of the lid the cigarette, pushed toward said roller at the extreme left by blades $b^4$ and $b^5$, will be carried outward along the upper surface of said roller until it drops outside and to the left of the nest of rollers. The cap or lid $b'$ remains open for tobacco to be introduced again, while the rollers $b$ cease to rotate and the cam $u'$ allows the lever $u$ to fall, the said lever $u$ returning to its position of rest.

What remains to be examined is the pasting and paper-feeding devices, which are as follows: The pulley $s$, rotated by the shaft $g^3$, gives continued movement to the belt $s^3$, the latter rotating the pulleys $s'$ and $s^2$ as well as the rollers $s^4$ and $s^6$. The roller $s^4$, which is immersed in the liquid paste in the vessel $s^5$, besmears with paste the outer face of the belt $s^3$, and should there be too much of this paste it is removed by the roller $s^6$, which allows the surplus paste to fall back into the vessel $s^5$. When the blade $f^0$ has placed the leaf of paper $x$ into the mold and the wheels $d'$ and $d^2$ have come into gear again, the journal $e^2$ is carried around by the rotation of the latter wheel, as is also the connecting-rod $e^6$, the lever $c^7$ vibrates, as well as the crank-arms $f$, pivoted to the same spindle $e^8$, the blade $f^0$ approaches the mold in turning upon itself as hereinbefore described, and at the end of its stroke it takes a vertical position, so as to become covered with paste by contact with the belt $s^3$. After the journal $e^2$ has turned half a revolution the said blade comes and places itself, covered with paste, above the table $g$.

The paper-feeding device is controlled by the cam $g^6$, which rotates with the shaft $g^3$ in causing the lever $g^7$ to vibrate. When the said lever $g^7$ has lowered the toothed rack $g^8$, the pinion $h$ rotates and moves the shaft $h'$ and the crank-arm $h^3$, which latter, by means of the pawl $h^4$, rotates the ratchet-wheel $h^6$ and the cylinder $h^{10}$, which communicates its movement to the cylinder $h^{11}$ and draws on the paper $i$, which unwinds on a drum $i'$ and comes forward on the table $g$. When that one of the crank-arms $f$ which is pivoted to the small connecting-rod $g^{13}$ acts on the latter so as to vibrate the lever $g^{12}$, the cam $g^{14}$ causes in its turn the blade $g^{10}$ of the scissors to vibrate in order to allow the paper $i$ to pass onto the table $g$, but when the small connecting-rod $g^{13}$ moves away from the mold and causes the cam $g^{14}$ to turn in the opposite direction the blade $g^{10}$ is brought back by the spring $g^{11}$ and cuts the required length from the strip of paper placed on the table $g$ to the length intended to surround the cigarette.

What I claim is—

1. In a cigarette-machine, in combination with a suitable frame, a series of rollers mounted therein, means for rotating said rollers, a guiding device for conducting the tobacco into the space between said rollers and located to produce a movement of the tobacco in a direction parallel with the axes of and along said rollers, and mechanism for feeding the tobacco into the guiding device, substantially as set forth.

2. In a cigarette-machine, in combination with a suitable frame comprising two sections hinged together, rollers inserted in said sections and adapted to jointly surround the tobacco forming a cigarette, means for rotating said rollers, and a guiding device for conducting the tobacco into the space between said rollers and located to produce a movement of the tobacco in a direction parallel with the axes of and along said rollers, substantially as set forth.

3. In a cigarette-machine, in combination with a suitable frame comprising two sections hinged together, rollers inserted in said sections and adapted to jointly surround a cigarette, means for rotating said rollers, means for swinging open one of said sections, and an ejecting device adapted to enter the space between said rollers after such swinging open of one of the sections and to force the cigarette toward the outer upper roller while the latter is revolving, substantially as set forth.

4. In a cigarette-machine, in combination with a suitable frame comprising two sections one placed above the other and hinged together, rollers inserted in said sections for shaping a cigarette, means for rotating said rollers, means for swinging open the upper section of the frame, and mechanism for lifting the cigarette above the rollers in the lower section of the frame, substantially as set forth.

5. In a cigarette-machine, in combination with a suitable frame, a series of rollers for rolling a cigarette mounted therein, means for rotating said rollers, and a guiding device provided with a tapering channel, such channel forming a continuation of the space between said rollers, substantially as set forth.

6. In a cigarette-machine, the combination with a frame, and a series of rollers mounted therein, of endless belts, two cheeks between which the belts are placed, rollers over which said belts travel, the axes of two of such rollers being movable in grooves in said cheeks, a feed-rod, two levers pivoted on the same spindle, a cam for actuating the same, a socket with which said rod is integral, a rod located in said socket and provided with a slot or notch, an opposing spring partially surmounting said rod, and a lever pivoted on a socket and adapted to engage with the slot or notch in said rod, said lever being arranged opposite a fixed stud on the rectangular roller-frame, substantially as set forth.

7. In a device for pasting and feeding the paper in a cigarette-machine, the combination with a blade, of two crank-arms carrying the same, two pinions at the end of said blade, two fixed toothed segments gearing with said pinions, an endless belt, an intermediate roller immersed in the liquid paste over which said belt passes, a pivoted table for the paper, a movable rod supporting said table, and a cam on which said rod rests, substantially as set forth.

8. In a paper-feeding device for a cigarette-machine, the combination with a drum mounted on a fixed support, collars attached to spiral springs and partially embracing the journals of said drum, tension-screws connected with said springs, two tangent cylinders placed one above the other, the bearings of one of said cylinders being movable, small pistons for holding said bearings, tension-springs regulated by screws in engagement with said pistons, a ratchet-wheel on the spindle of the other cylinder, two pawls in engagement therewith, one of said pawls arranged on a fixed axis, a toothed pinion, a crank-arm on the spindle of said pinion, the aforesaid second pawl being secured to the end of said crank-arm, a toothed rack gearing with said pinion, a lever to which said rack is pivoted, an opposing spring, and a cam in engagement with said lever, substantially as set forth.

9. In a paper-cutting device for a cigarette-machine, the combination with a table adapted to turn, of two scissors-blades, one of said blades being fixed to one side of said table, a lever, a controlling connecting-rod to which the same is pivoted, a cam on the axis of said lever, the second blade being arranged underneath said cam, and an opposing spring for said second blade, substantially as set forth.

10. In an ejecting device for a cigarette-machine the combination with a sectional, hinged roller-frame, two blades pivoted on the lid of said frame, each blade having a toothed end gearing with the corresponding end of the other blade, an opposing spring in engagement with one of said blades, a projecting lug on said blade, an elbow-lever, and a cam on which one arm of said lever rests, substantially as set forth.

In witness whereof I have hereunto set my hand in presence of two witnesses.

HENRI FELIX MARIE LEMAIRE.

Witnesses:
  A. JULIEN,
  A. TOUGUÉ.